(12) United States Patent
Moorman

(10) Patent No.: US 11,165,255 B2
(45) Date of Patent: Nov. 2, 2021

(54) SYSTEM AND METHOD FOR ENHANCED EFFICIENCIES IN ELECTRICAL POWER DISTRIBUTION

(71) Applicant: MOSER ENERGY SYSTEMS, Evansville, WY (US)

(72) Inventor: Darrin Moorman, Oldenburg, IN (US)

(73) Assignee: MOSER ENERGY SYSTEMS, Evansville, WY (US)

( * ) Notice: Subject to any disclaimer, the term of this patent is extended or adjusted under 35 U.S.C. 154(b) by 199 days.

(21) Appl. No.: 16/291,736

(22) Filed: Mar. 4, 2019

(65) Prior Publication Data

US 2019/0273381 A1    Sep. 5, 2019

Related U.S. Application Data

(60) Provisional application No. 62/637,936, filed on Mar. 2, 2018.

(51) Int. Cl.
| | |
|---|---|
| H02J 3/38 | (2006.01) |
| H02J 3/32 | (2006.01) |
| H02J 7/00 | (2006.01) |
| E21B 43/12 | (2006.01) |
| H02J 3/00 | (2006.01) |

(52) U.S. Cl.
CPC ............... *H02J 3/381* (2013.01); *H02J 3/32* (2013.01); *H02J 3/383* (2013.01); *H02J 7/0068* (2013.01); *E21B 43/127* (2013.01); *H02J 3/003* (2020.01)

(58) Field of Classification Search
CPC .... H02J 3/00; H02J 7/00; Y02E 10/00; E21B 43/00; F04B 47/00
See application file for complete search history.

(56) References Cited

U.S. PATENT DOCUMENTS

| | | |
|---|---|---|
| 7,105,940 B2 | 9/2006 | Weesner et al. |
| 10,389,121 B1* | 8/2019 | Sherry .................... H02S 10/12 |
| 2005/0171657 A1 | 8/2005 | Kumar |
| 2006/0010867 A1 | 1/2006 | Shaw |
| 2008/0078435 A1 | 4/2008 | Johnson |
| 2008/0088183 A1* | 4/2008 | Eckroad ................ H02J 3/1842 307/66 |
| 2011/0095606 A1* | 4/2011 | Ou .......................... H02J 3/386 307/26 |
| 2011/0120789 A1 | 5/2011 | Teraya |
| 2011/0148209 A1 | 6/2011 | Williams |
| 2012/0047894 A1 | 3/2012 | Ward |
| 2014/0184136 A1 | 7/2014 | Ture |

(Continued)

OTHER PUBLICATIONS

U.S. Appl. No. 16/779,949, filed Feb. 3, 2020, Moorman.
Official Action for U.S. Appl. No. 16/779,949, dated May 13, 2021, 21 pages.

*Primary Examiner* — Hal Kaplan
*Assistant Examiner* — Joseph N Inge
(74) *Attorney, Agent, or Firm* — Sheridan Ross P.C.

(57) ABSTRACT

An improved system and method for managing and distributing electrical power is provided. In various embodiments, systems and methods comprise at least one powered device that receives electrical power from at least one source. Structure and devices are provided within the system to monitor, regulate, and transmit power from a source to a powered or driven device in an efficient and reliable manner based on availability, cost, and environmental factors.

19 Claims, 3 Drawing Sheets

(56) References Cited

U.S. PATENT DOCUMENTS

| | | | |
|---|---|---|---|
| 2014/0306526 A1 | 10/2014 | Fontana et al. | |
| 2015/0012144 A1 | 1/2015 | Wang-Yigang et al. | |
| 2015/0280489 A1 | 10/2015 | Curlett | |
| 2015/0338868 A1 | 11/2015 | Takaguchi et al. | |
| 2017/0002635 A1* | 1/2017 | Williams | F04B 47/022 |
| 2017/0317521 A1 | 11/2017 | Anderlohr et al. | |
| 2017/0358929 A1* | 12/2017 | Koeppe | H02J 3/02 |
| 2018/0076661 A1 | 3/2018 | Herbener | |
| 2019/0237968 A1 | 8/2019 | Higginson et al. | |

* cited by examiner

SYSTEM AND METHOD FOR ENHANCED EFFICIENCIES IN ELECTRICAL POWER DISTRIBUTION

This U.S. Non-Provisional Patent Application claims the benefit of priority from U.S. Provisional Patent Application Ser. No. 62/637,936, filed Mar. 2, 2018, the entire disclosure of which is hereby incorporated by reference.

FIELD

The present disclosure relates generally to methods and systems for enhancing efficiencies in the distribution, management and use of electrical power. More specifically, the present disclosure provides systems and methods for integrating a plurality of sources of electrical power or current and delivering electrical power to a system or device in need of such power.

BACKGROUND

Various methods and systems for delivering power in the form of electrical current are known. Most commonly, such methods and systems comprise the ability to connect to a public utility network or "grid" comprising a complex network of electrical power production facilities providing power to buildings, homes, and devices connected to the grid. Distributed energy resources including, but not limited to gas-powered generators and photovoltaic arrays are also known to provide power to devices particularly where access to a public utility network is not possible or practical. There has been a long-felt and unmet need to provide an improved system for delivering electrical power to systems and devices requiring such power, and wherein various features of the system are integrated to enhance efficiencies.

SUMMARY

Accordingly, embodiments of the present disclosure contemplate and provide methods and systems for efficiently using, conveying, and managing electrical power. In some embodiments, features and systems of the present disclosure are useful for efficiently powering and managing devices and systems that require a non-constant or cyclic power demand. Such devices and features include, but are not limited to, pumpjacks for use in oil and gas extraction that require a non-constant power input during their operation. It will be recognized, however, that systems, devices and methods of the present disclosure are not limited to pumpjacks or even to cyclic loading applications. Various inventive aspects and features are provided herein that are not limited to use with a particular device. It is contemplated, for example, that features shown and described herein may be provided with and useful for managing power distribution to any device which requires electrical power input. For example, systems and devices of the present disclosure may be useful for powering a device with a substantially constant load requirement (e.g. a fan) and wherein the most cost-effective and/or reliable source of power is selected by the system. Systems, methods and devices of the present disclosure are also useful for and operable to communicate with a plurality of devices distributed across a network. Although some embodiments of the present disclosure relate to powering and managing a specific or discrete number of powered devices, features, systems and methods of the disclosure are also applicable for use with a network or grid.

In various embodiments, systems and methods of the present disclosure comprise various features for selecting at least one of a plurality sources based on cost, reliability, and cleanliness of the source(s).

In various embodiments, an integrated system is provided that is operable to economically dispatch, control, and allocate power from a plurality of sources. In preferred embodiments, at least one controller is provided in the system and the controller is arranged and operable to monitor for the most cost-effective method and supply of energy and electrical power from the plurality of sources. For example, in some embodiments, a system comprises at least one powered device that is arranged to receive power from at least one of a plurality of available sources. The plurality of available sources may include, for example, at least two of a public electrical power grid, a gas-powered generator (e.g. a diesel, gasoline, or natural-gas fired generator), a photovoltaic array, a battery, and a wind-powered electrical generator. Based on various operating conditions, the cost per kilowatt hour of power from one or more of the plurality of available sources may change. Systems and methods of the present disclosure provide for at least one controller to continuously monitor the costs of such energy, and to selectively or automatically adjust operation of the system such that the powered device draws power from the cheapest and/or most efficient energy source.

In various embodiments, grid-interactive systems are provided. Grid-interactive systems of the present disclosure generally comprise the ability to perform services and/or apply value to a local utility grid. In some embodiments, systems are provided that are operable to monitor grid conditions and detect grid instability (e.g. when a transformer fails and/or when supply is not sufficient to meet demand). Systems of the present disclosure are operable to selectively remove or isolate themselves from the grid when such conditions occur and convert to drawing energy from a distributed energy source that is part of the system. The grid and system both benefit from such logic and operability, wherein the demand on the grid is reduced and the system provides itself with a more reliable and stable supply of power. In some embodiments, a system is configured to be commanded or diverted away from a local utility grid. Such commands may be delivered or controlled from various sources including, for example, a remote source such as a remote computing unit (PC, smartphone, ethernet connection, etc.).

Embodiments of the present disclosure contemplate the provision of at least one bi-directional inverter. In some embodiments, it is contemplated that a bi-directional inverter comprises a commercially-available EPCPOWER™ HYDRA Module, or a commercially-available GO ELECTRIC INC. LYNC 75 inverter. Inverters of the present disclosure provide the ability to over and under-drive an electrical load to provide enhanced control and efficiency and perform re-generation or energy recovery operations. Regeneration systems and operations of embodiments of the present disclosure are provided to enhance system operation and recover energy. In some embodiments, the recovered energy may be stored in a battery, for example.

Embodiments of the present disclosure contemplate the provision of a controller that is not specific to hardware or components within the system. Controllers and inverters are contemplated for use with hybrid generators, including generators that comprise a motor-driven generator with integrated electrical control components and/or energy storage features.

In various embodiments, operational efficiencies and fuel efficiencies are greatly enhanced. In some embodiments, a system is provided that is capable of improving fuel efficiency by up to 70%, wherein an engine is isolated from a cyclic load and the need for high engine performance and/or energy consumption typically required to power a peak load is eliminated. An engine or power source is contemplated that is operable to "ramp" slowly to an optimum output, charge a battery connected to the system, and orderly "ramp" down and shut down, thereby significantly reducing the operating and maintenance costs of the system. In various embodiments, the system comprises a powered or driven device with a cyclic loading cycle including. Such devices may include, for example, a pumpjack. In such embodiments, a prime mover is coupled to a linkage that is driven in a cyclic manner and wherein a downstroke of the system requires significantly less power than an upstroke wherein fluids and system components are drawn upwardly against the force of gravity. Although certain embodiments of the present disclosure are specifically contemplated for use with such systems, it will be recognized that the present disclosure is not limited to such system. Various inventive concepts of the present disclosure are operable to enhance efficiencies and control power selection and distribution in various applications including but not limited to cyclic loading applications.

In various embodiments, systems of the present disclosure comprise an ability to absorb or "regenerate" energy from a load thereby significantly reducing a total energy consumption of the system (e.g. by approximately 30% or more) while also providing infinite speed control on both loading and unloading cycles and overall enhanced efficiencies. As will be recognized by one of ordinary skill in the art, a pumpjack may comprises a prime mover in the form of an electric motor. In embodiments of the present disclosure, the electric motor is in communication with a bi-directional inverter to control, manage, and transmit electricity as commanded by a controller integrated into the system.

In one embodiment, a system for distributing electrical power is provided. The system comprises a powered device that is operable to receive electrical power from at least one source and an inverter in communication with the powered device. The inverter comprises a bi-directional inverter that is operable to convey and receive electrical power to and from the powered device in the form of a current. The inverter is in communication with and operable to receive a current from at least one of a battery, a distributed energy resource, and a power grid. A controller is provided that is operable to receive and transmit information from at least one of the powered device(s), the inverter, the battery, the distributed energy resource and the grid, and the controller is further operable to selectively control the source of electrical power delivered to the powered device.

In various embodiments, methods of controlling and distributing energy are provided. In one embodiment, a method of controlling and distributing energy is provided that comprises providing a powered device that is operable to receive electrical power from at least one source and an inverter in communication with the powered device. The inverter comprises a bi-directional inverter that is operable to convey and receive electrical power to and from the powered device in the form of a current. The inverter is operable to receive a current from at least one of a battery, a distributed energy resource, and a power grid. A controller is provided that is operable to receive and transmit information from at least one of the powered device, the inverter, the battery, the distributed energy resource and the grid, and the controller is further operable to selectively control the source of electrical power delivered to the powered device. The method comprises monitoring the operating conditions of at least one of the power grid, the distributed energy resource, and the battery via the controller. Conditions such as cost per kilowatt-hour, reliability, energy resource availability, and charge-levels may be monitored. Based on the monitoring step, at least one source of electrical power is selected from the at least one of a battery, a distributed energy resource, and a power grid. Electrical power is delivered to the powered device to perform an intended function of the powered device.

In various embodiments, renewable energy resources are provided and the renewable energy resources are operable to and configured to deliver electrical power to at least one of a powered device and a battery of the system. In some embodiments, renewable energy resources are configured to be used as the default source of power for at least one of the powered device and the battery. For example, in some embodiments a photovoltaic array is provided that delivers power and electrical current to the powered device and/or the battery. A controller is provided and the controller is configured to deliver or route power from the photovoltaic array to powered device and/or battery whenever the output from the array is acceptable. The controller is further operable to recruit power from additional sources, or change the source of power to alternative sources (e.g. a gas-powered generator) when the photovoltaic array cannot meet demand and the controller identifies the lack of ability to meet demand.

The Summary is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Figure 1:
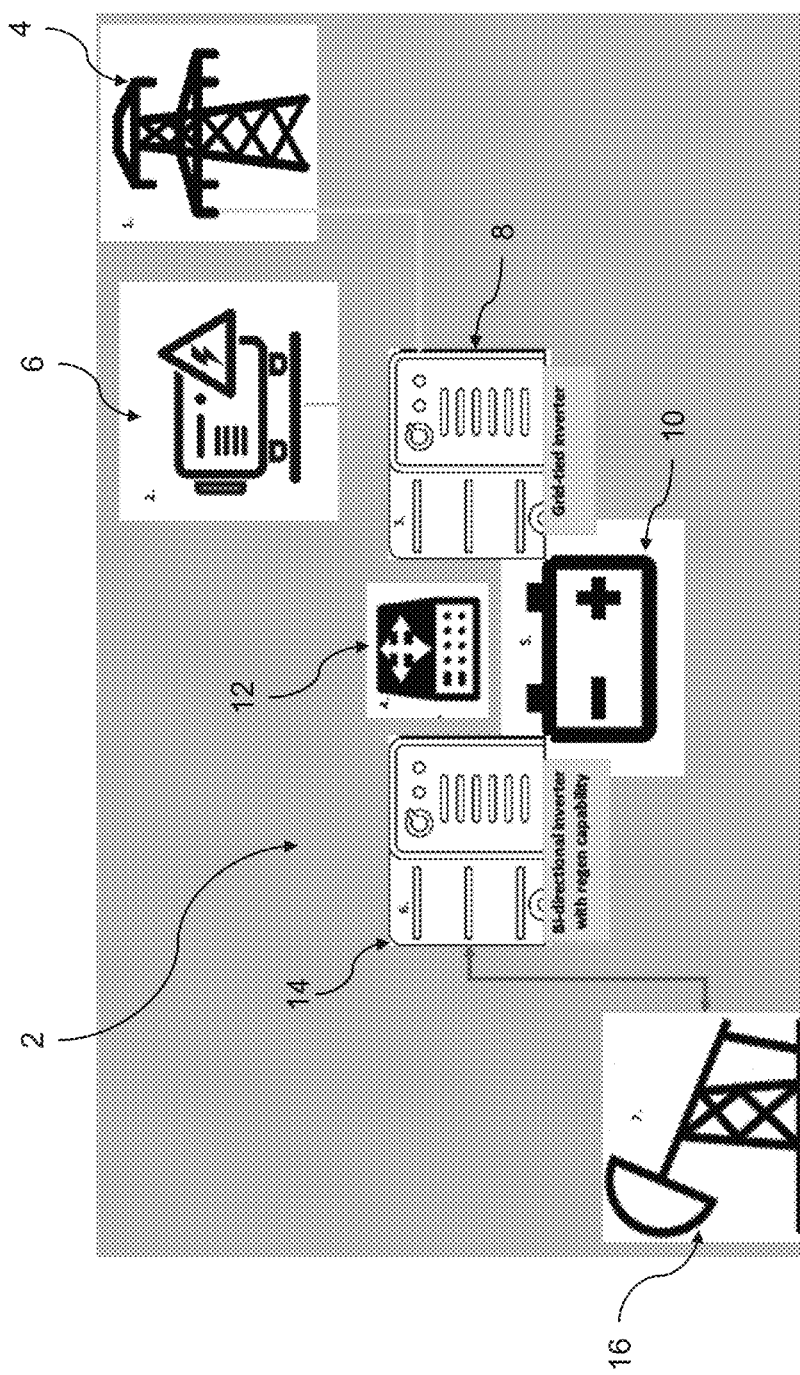
FIG. 1 is a schematic of an energy management and distribution system according to one embodiment of the present disclosure.

FIG. 1 is a schematic of a system 2 according to one embodiment of the present disclosure. As shown, a system is provided that comprises a connection and/or ability to connect to commercial utility power also known as the "grid" 4. The grid 4 comprises a generally-available source of electrical power made available to the public from a local utility through a network as will be recognized by one of ordinary skill in the art. The system 2 also comprises a distributed energy resource ("DER") 6. The DER may comprise various devices and combinations thereof including, for example, a thermal power generation unit (e.g. gas or diesel generator), a renewable energy resource (e.g. a photovoltaic array, a wind turbine, etc.), and various combinations thereof. Preferably, the alternating current ("AC") voltage output of the DER is matched to that of the voltage from the utility power source 4. An inverter module 8 is provided that comprises a grid-interactive, multiple-input, synchronizing system that integrates various energy resources and rectifies an AC input from each source to an appropriate direct current ("DC") to charge a battery storage module 10. The battery storage module 10 comprises at least one rechargeable battery. Various rechargeable battery and energy storage solutions are contemplated in embodiments of the present disclosure. In some embodiments, at least one LECLANCHE Energy Storage Solutions Apollian Cube battery is provided with systems of the present disclosure.

Certain embodiments of the present disclosure contemplate a system wherein the direct power source for a load 16 comprises the battery 10. The battery 10 is charged and/or kept at a certain charge level by at least one of the grid 4 and the DER 6. In alternative embodiments, however, it is contemplated that a system comprises a driven device 16 that is connected to and operable to receive power directly from any one or more of the grid 4, the DER 6, and the battery 10. Accordingly, when a controller 12 deems that the grid 4 is the most efficient, cost-effective, and/or cleanest source of available power, current from the grid 4 is directly conveyed to the driven device 16. Furthermore, if the grid 4 is detected as being unreliable or economically inefficient, the system is configured to selectively convert to drawing power from the DER 6 and/or the battery 10. In such embodiments, the battery 10 may be charged by various means including, for example, directly from the grid 4 when grid parameters and pricing permits. The battery 10 may also be charged or powered by the DER 6 or a separate on-site DER or similar device.

A micro-grid controller ("MGC") 12 is provided that is operable to receive and transmit information to and from all integrated energy resources and devices. The MGC 12 provides synchronization functions including, for example, managing a charge level for the battery module 10, and selecting and using the appropriate energy resource depending on cost and availability (for example). The MGC 12 comprises the ability to regulate the bi-directional (charging side) and the regenerative (load side) inverter modules. Load sensing and load management are also controlled by the MGC. In various embodiments, the MGC 12 is also operable to receive data and information from external sources. For example, the MGC 12 is contemplated as being connected to the internet such that it is operable to receive data related to the price of power from the grid, current and future weather conditions, etc.

As shown in FIG. 1, the battery module 10 is operable to store and discharge energy (from various sources) to support the needs of the system. The power and energy capacity of the battery module 10 may be modified as will be recognized by one of ordinary skill in the art. Battery systems of such construction are known to exist with a storage capacity of up to approximately 100 megawatts. Systems of the present discourse are operable in various applications and with various batteries and battery systems and the present disclosure is not limited to use with a particular battery or battery capacity. The power and energy capacity of the battery module 10 of various embodiments is operable to provide the necessary output to the load and to provide sufficient capacity to optimize power generation efficiency and reduce the duty cycle of the thermal generator, for example. In some embodiments a thermal generator is provided, and the generator only runs at maximum efficiency and only to maintain a minimum charge level of the battery module 10. Such embodiments reduce emissions, improves system efficiency and eliminates "wet-stacking" (i.e. a condition wherein un-combusted fuel passes into an exhaust system) concerns on partially-loaded emissions-controlled generators.

As further shown in FIG. 1, a bi-directional inverter 14 is provided that is operable to distribute power and absorb a load. In at least some embodiments, the inverter 14 provides power to the load or powered device 16 at a commanded output to optimize load output and absorb power from the load when possible. This energy absorption or "regen" feature provides the ability to reduce total energy consumption of the system from the generating assets (4, 6, for example) by recovering energy otherwise lost during a cyclic load. For example, in embodiments wherein the load 16 comprises the power demands of a pumpjack, the lowering of the pumpjack 16 and associated components (e.g. head, bridle, rod, etc.) typically comprises a braking force to control the lowering movement wherein kinetic energy of a weight moving under the force of gravity results in at least some energy being wasted (e.g. through gearing or braking and via heat, sound, etc.)

In some embodiments, and as shown in FIG. 1, the bi-directional inverter 14 is provided and the system is operable to capture and/or store such energy. The regen energy of such embodiments may be employed in subsequent loading cycles (e.g. a subsequent upstroke) of the pumpjack 16, used in other application (e.g. lighting), and/or sold and distributed back to the grid 4. The system and the regen inverter 14 are further operable to provide infinite control of the electrical output and speed control of a driven device 16. Infinite control on the controller 12 is operable to regulate a rate of energy regeneration.

As shown in FIG. 1, a power load or demand is associated with a driven device comprising a pumpjack 16. The pumpjack 16 is typically subjected to a heavy cyclic loading and unloading as a lift rod and related components travel down a well or bore during an unloading or downstroke and the pumpjack 16 reciprocates upwardly during a loading or upstroke. As shown, the controller 12 is operable to sense a speed, pressure and/or flow rate from the pumpjack 16 and an associated pump. The controller 12 is further operable to adjust and regulate the speed of each cycle to provided optimum pump efficiency through power output and dynamic braking. Typically, a high degree of variability is provided in a pumpjack operation of the prior art and wherein no control is provided on lift rod actuation. Embodiments of the present disclosure as shown and described herein provide for such control by monitoring, regulating, and controlling power output and input (e.g. braking).

Although FIG. 1 depicts an embodiment wherein cyclic power load requirements are contemplated based on the provision and use of a pumpjack 16, it will be recognized that the present application is not limited to use with a pumpjack or any particular powered device. It is contemplated that features and systems of the present disclosure are operable to be employed with power usage demands at the downstream or user-end of the system. For example, it is contemplated that a single facility (e.g. a hospital) is provided with various features and systems of the present disclosure including, for example, a connection to a grid 4, a DER 6, a battery module 10, a controller 12, and at least one inverter 8, 14. The demands of the facility will be variable, but not necessarily cyclical. However, the systems disclosed herein are operable to provide, control and regulate the appropriate power supply to the facility, provide a reliable source of energy, and isolate the facility from a grid when economic factors require or permit.

Figure 2:
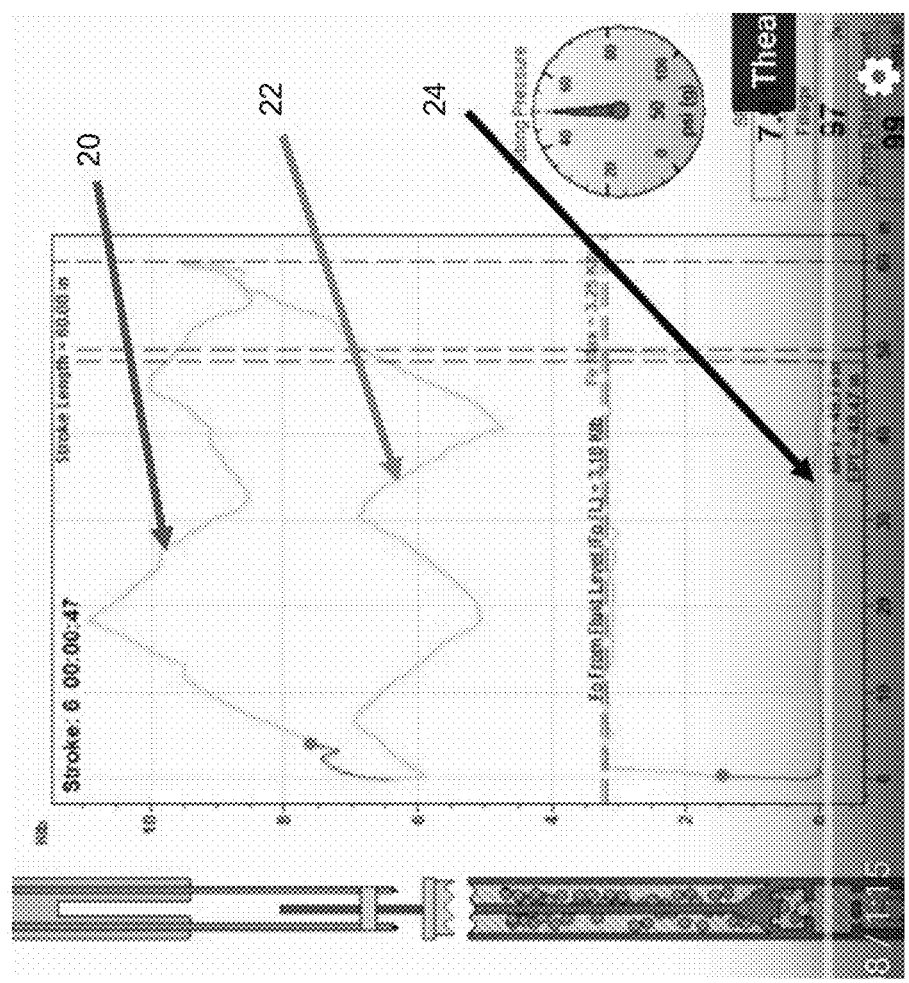
FIG. 2 is a plot of the operation and load cycle of a powered device.

FIG. 2 is a plot showing an efficient stroke cycle of a pumpjack according to a system of the present disclosure (see, e.g. FIG. 1). A first plot line 20 illustrates an upstroke or loading of the system wherein power is required to vertically displace the weight of components of the pumpjack and fluids being drawn from a well. A second plot line 22 illustrates the downstroke or unloaded portion of the cycle, which is used for regeneration purposes in various embodiments of the present disclosure. The x-axis values represent the overall distance or displacement of the stroke and wherein the stroke length is approximately 60 inches. The y-axis values represent the load on the system in Klb. The inverse nature of the loading and unloading plot lines 20, 22 represent an opportunity for energy recapture and regeneration. Systems of the present disclosure are operable to capture or "regen" energy from an unloading cycle using features and methods shown and described herein. Energy consumption is reduced regardless of whether power is provided by a distributed source or by the utility grid. The overall cost of operating the system and emissions related to the use of the system are significantly reduced compared with known systems, methods and devices. Similarly, efficiencies are significantly enhanced. As further shown in FIG. 2, a third plot line 24 illustrates a flow rate of the system that comprises a highly-efficient and steady flow of fluid from a well bore (for example).

Figure 3:
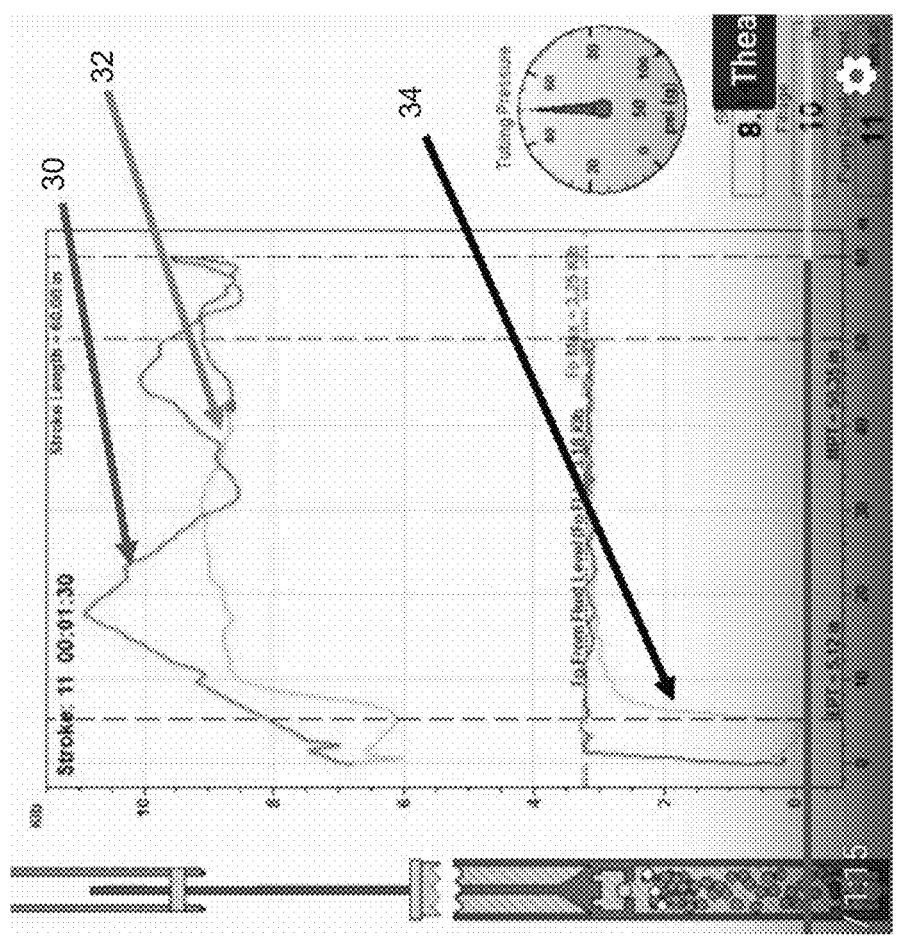
FIG. 3 is a plot of the operation and load cycle of a powered device.

FIG. 3 is a plot of a stroke cycle of a pumpjack according to another embodiment of the present disclosure. As shown, the system of FIG. 3 is operating with reduced efficiency as compared with the system of FIG. 2. A stroke speed is similar and consistent with that of FIG. 2 wherein a pumpjack is operating at approximately eight strokes per minute with a displacement of approximately 60 inches. However, Pillage of a travelling valve and flowrate is reduced.

A plot of the loading cycle 30 is similar to that of the loading cycle in FIG. 2 while the unloading cycle 32 is significantly different. The conditions of FIG. 3 may be ascribed to a fluid being pumped that comprises a higher viscosity than that of FIG. 2, for example. The lowering of the pumpjack features during the unloading cycle 32 requires significantly more force as shown in FIG. 2. However, regeneration of power and distribution, storage, etc. of the same is still possible using systems and components of the present disclosure. At minimum, power distribution, selection, and use during the loading and unloading cycles of FIGS. 2 and 3 is accomplished by the system shown in FIG. 1. The speed of each cycle may be regulated using pressure, flow and speed as feedback or inputs to the controller 12 that is in communication with the regen inverter 14 in various embodiments.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A system for distributing electrical power, the system comprising:
    a powered device with a variable power demand that is operable to receive electrical power from at least one source;
    a first inverter in communication with the powered device, wherein the first inverter comprises a bi-directional inverter that is operable to transmit and receive electrical power to and from the powered device in the form of a current and based on a positive or negative power demand from the powered device;
    a second inverter in communication with and operable to receive a current from a source, and wherein the source comprises at least one of a public electrical power grid, a gas-powered generator, a photovoltaic array, a wind-powered electrical generator, and a first battery;
    wherein the second inverter comprises a synchronizing system that is operable to integrate various energy resources and charge a second battery;
    wherein the second battery comprises a rechargeable battery;
    wherein the second battery is provided in communication with the first inverter and the second inverter and is operable to send and receive electrical power to and from the first inverter and the second inverter;
    a controller that is operable to receive information from the source and the powered device, and wherein the controller is operable to adjust the operation of the powered device;
    wherein the controller is operable to continuously monitor at least one of the type, the availability, and the cost of electrical power from the source;
    wherein the controller is further operable to selectively control the current delivered to the powered device based on information received by the controller.

2. The system of claim 1, wherein the second inverter is operable to convert an alternating current to a direct current.

3. The system of claim 1, wherein the controller is provided with a default setting to draw current from a renewable energy resource.

4. The system of claim 1, wherein the powered device receives current from the second battery and wherein a charge state of the battery is managed by the controller.

5. The system of claim 1, wherein the controller is operable to receive manual inputs from a remote source.

6. The system of claim 5, wherein the remote source comprises a computer.

7. A system for managing electrical power, the system comprising:
    a powered device that is operable to receive electrical power from at least one source and wherein the powered device comprises a cyclical power demand;
    a distributed energy resource;
    a battery module;
    a first inverter in communication with the distributed energy resource and the battery module;
    a second inverter in communication with the powered device, wherein the second inverter comprises a bi-directional inverter that is operable to transmit and receive electrical power to and from the powered device in the form of a current;
    wherein the second inverter is in communication with and operable to receive a current from battery module, and the battery module is operable to receive current from a second inverter, and the second inverter is connected to at least one of the distributed energy resource, and a power grid; and
    a controller that is operable to receive and transmit information from at least one of the powered device, the first inverter, the second inverter, the battery module, and the distributed energy resource;
    wherein the information comprises at least one of the type, the availability, and the cost of electrical power from the at least one source;
    wherein the controller is further operable to selectively control the source of electrical power delivered to the powered device based on the information; and
    wherein the powered device receives current from the battery module and wherein a charge state of the battery is managed by the controller based on electrical power input information from at least one of a distributed energy resource and a power grid.

8. The system of claim 7, wherein the powered device comprises at least one of a pump and a pumpjack with a cyclic power requirement.

9. The system of claim 7, wherein the controller is connected to the internet and is operable to receive data related to at least one of: grid-power pricing, weather forecasts, and power demand forecasts.

10. The system of claim 7, wherein the second inverter is operable to direct a current from the powered device to at least one of the battery module and the power grid.

11. The system of claim 7, wherein the controller is configured to receive pricing information related to the cost of electrical power from a utility grid, the battery module and the distributed energy resource, and the controller is configured to automatically deliver power to the powered device from a utility grid, the battery module and the distributed energy resource based on said pricing information.

12. The system of claim 7, wherein the distributed energy resource comprises a gas-powered generator.

13. The system of claim 7, wherein the powered device comprises a pumpjack and the pumpjack comprises a generator that is operable to convert a braking force of the pumpjack during a downstroke to electrical current.

14. A method of controlling and distributing energy comprising:
    providing a powered device that is operable to receive electrical power from at least one source and a first inverter in communication with the powered device, wherein the first inverter comprises a bi-directional inverter that is operable to convey and receive electrical power to and from the powered device in the form of a current; and a second inverter that comprises a multiple input inverter operable to receive a current from at least two of a battery, a distributed energy resource, and a power grid; and a controller that is operable to receive and transmit information from at least one of the powered device, the inverter, the battery, the distributed energy resource and the grid, and wherein the controller is further operable to selectively control the source and amount of electrical power delivered to the powered device;

continuously monitoring operating conditions of at least one of the power grid, the distributed energy resource, and the battery via the controller;

wherein the operating conditions comprise at least one of cost of power from the grid, reliability, availability, and charge-level of the battery;

based on the monitoring step, selecting via the controller at least one source of electrical power from the at least one of a battery, a distributed energy resource, and the power grid;

delivering electrical power to the powered device to perform an intended function of the powered device.

15. The method of claim 14, wherein the powered device comprises a pumpjack.

16. The method of claim 15, further comprising a step of recharging the battery during an unloading or downstroke of the pumpjack.

17. The method of claim 14, wherein the step of selecting at least one source of electrical power from the at least one of a battery, a distributed energy resource, and a power grid comprises a step of a user manually selecting at least one source of electrical power.

18. The method of claim 14, wherein the system further comprises a photovoltaic array and wherein the controller comprises a setting wherein the photovoltaic array comprises a preferred or default source of electrical power for the powered device.

19. The method of claim 14, wherein power from the system is delivered to the grid when the powered device is not operational.

* * * * *